RECTANGULAR WAVE GENERATOR FOR COLOR TELEVISION

Filed March 16, 1954 2 Sheets-Sheet 1

INVENTOR
MICHAEL V. SULLIVAN
BY
Hugh S. Wertz
ATTORNEY

May 27, 1958 M. V. SULLIVAN 2,836,717

RECTANGULAR WAVE GENERATOR FOR COLOR TELEVISION

Filed March 16, 1954 2 Sheets-Sheet 2

INVENTOR
MICHAEL V. SULLIVAN
BY
Hugh S. Wertz
ATTORNEY 2,836,717

RECTANGULAR WAVE GENERATOR FOR COLOR TELEVISION

Michael V. Sullivan, Florham Park, N. J., assignor to Bell Telephone Laboratories, Incorporated, New York, N. Y., a corporation of New York Application March 16, 1954, Serial No. 416,651

1 Claim. (Cl. 250—27)

This invention relates to television systems and more particularly to a rectangular wave generator for use in providing a test pattern for a color television system.

In the design, development and manufacture of color television apparatus it has become desirable to have available for testing of the television apparatus a color producing signal derived from a source that is of simple construction and is reliable in operation. In the color television art, as in that of monochrome television, the realization has been that the simplest, least expensive and most reliable source of television signals is an all-electronic signal generator which can be connected directly into the television system thereby doing away with the need for an expensive and complex camera chain. Such all-electronic color signal generators have come to be known as color bar generators because they provide a pattern of signals which as presented on the screen of a color television receiver appear as an arrangement of of vertical bars of different colors or hues.

In addition to providing a color bar pattern it has been found desirable that the color bar generator should also provide a large selection of colors including black and white in one picture frame and that the order of sequence of colors in the color bar pattern should be readily changeable. Such an improved color bar generator should not only retain the features of simplicity and reliability but should also be compact and provide simple control means for changing the order of sequence of colors in the color bar pattern.

It is an object of this invention to provide a simplified and improved color bar generator.

It is a further object of the invention to provide an improved color bar generator capable of providing a large selection of color sequences in the color bar pattern.

It is a specific object of the invention to provide a rectangular wave generator capable of providing a multiplicity of simultaneous and mutually related rectangular output waves.

The invention in one of its aspects contemplates a color bar generator comprising three multivibrators connected in series between an input terminal and an output terminal, each succeeding multivibrator having a period equal to one-half that of the preceding multivibrator. The first multivibrator is triggered by an external pulse such as a horizontal synchronizing pulse and the multivibrator has a balanced operational period which is equal to the period between two successive horizontal synchronizing pulses. The rectangular waves at both tubes in each multivibrator are equal and opposite in phase and are provided as output signals. In addition, the rectangular waves of the first multivibrator are each differentiated and then combined in a single adder tube to provide a train of pulses of one polarity which are applied as triggering pulses to the next succeeding, or second, multivibrator. This second multivibrator is triggered at twice the frequency of the first multivibrator by the applied pulses thereby providing rectangular output waves of twice the frequency of the first multivibrator. A third multivibrator is coupled to the second multivibrator in the same manner that the first multivibrator is connected to the second. Obviously, the third multivibrator will have twice the operational frequency of the second multivibrator and four times the operational frequency of the first multivibrator providing rectangular output waves of twice the frequency of the second multivibrator and four times the frequency of the first multivibrator. Three output signals from the three multivibrators are applied respectively to the red, green and blue video signal input terminals of a color television system.

One important advantage of this arrangement is that all of the output waves of the multivibrators are synchronously controlled by the external triggering pulses applied to the multivibrator.

Another important advantage of the arrangement is that the color bar generator provides a color bar pattern of eight different colors or hues including black and white and by changing the combination of signals chosen from the outputs of the multivibrators a large selection of color sequences in the color bar pattern can be impressed on the color television system.

The invention, its objects and advantages will be better understood by referring to the following description and drawings, forming a part thereof, wherein.

Figure 1:
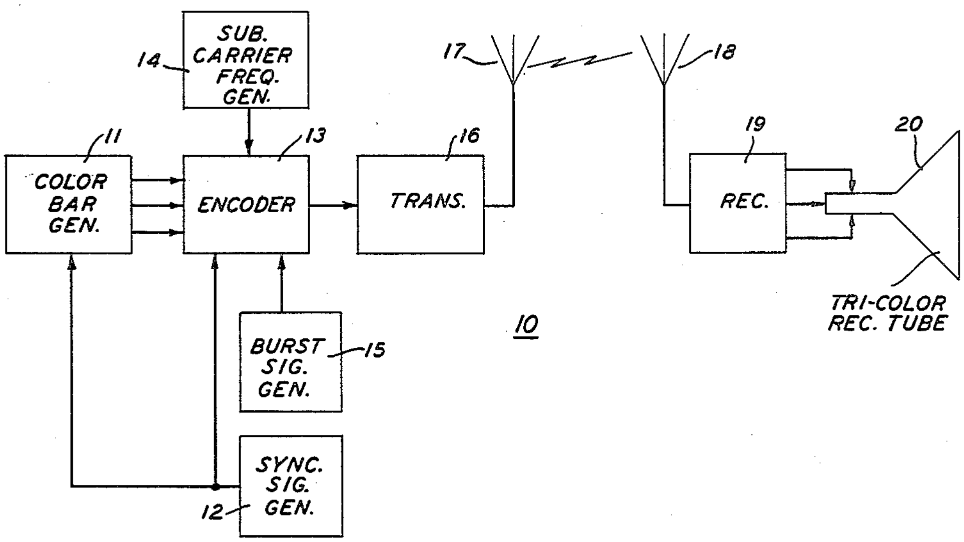
Fig. 1 shows in block schematic form a color television system including a color bar generator in accordance with the invention.

With specific reference to Fig. 1 there is shown therein a complete color television system 10 including color signal generating and transmitting means and a color signal receiving means. A color bar generator 11 in accordance with the invention is triggered into operation by a synchronizing signal from generator 12 and provides output signals to be utilized as red, green and blue video signals which are applied to an encoder circuit 13. The encoder circuit is a unit which accepts red, green and blue video signals from a color video source, in this instance the color bar generator 11, and packages these signals with the synchronizing signal from generator 12, the color subcarrier signals from generator 14 and burst keying pulses from generator 15 into a standard composite color video signal. The composite color video signal from the encoder 13 is applied to a transmitter 16 from which the signals are broadcast by antenna 17. Antenna 18 intercepts the signal transmitted by antenna 17 and applies it to the color receiver 19 wherein the composite signal is separated into red, green and blue video signals which are applied individually to the cathodes or other control elements of a tricolor receiver tube 20.

Figure 2:
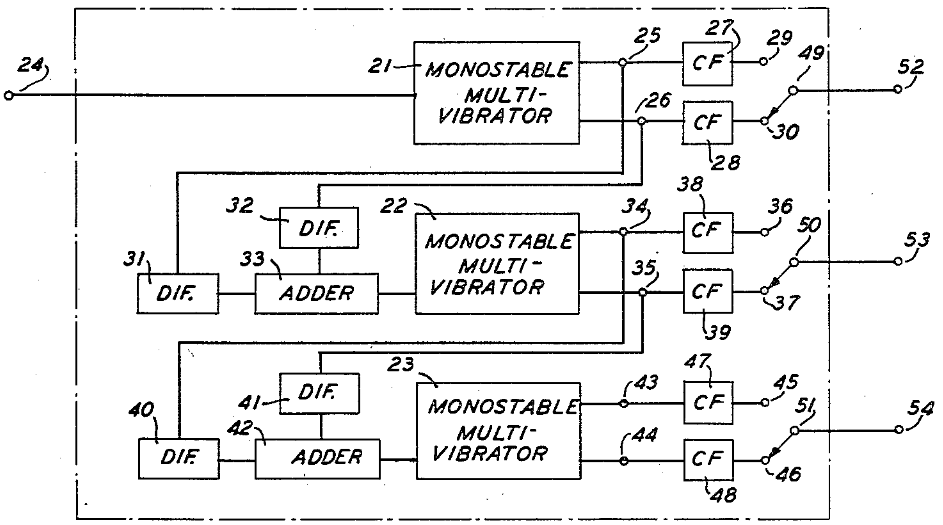
Fig. 2 shows a circuit diagram in block form of a color bar generator in accordance with the invention.
Figures 3A, 3B, 3C, 3D, 3E, 3F, 3G, 3H, 3I, 3J, 3K, 3L, 3M:
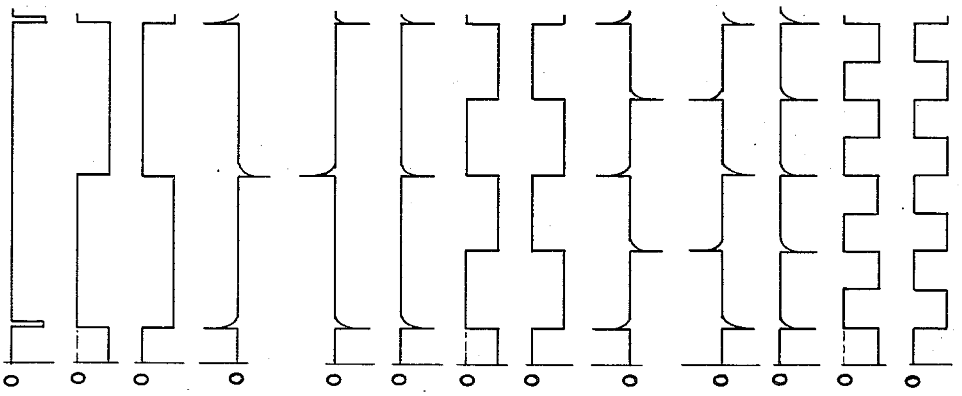
Figs. 3A through 3M show wave forms appearing in the color bar generator of Fig. 2.

The color bar generator 11 in accordance with the invention is shown in greater detail in the circuit diagram of Fig. 2. The color bar generator 11 comprises three series-connected monostable multivibrators 21, 22 and 23, each arranged to provide a pair of output signals and to operate in synchronism with the occurrence of an external trigger pulse. Multivibrator 21 has an unstable period equal to one-half the time between two horizontal synchronizing pulses and is triggered into its unstable condition by a horizontal synchronizing pulse as shown in Fig. 3A applied to input terminal 24. The output thereof is two oppositely phased rectangular waves as shown in Figs. 3B and 3C appearing at terminals 25 and 26, respectively, which are applied to intermediate output terminals 29 and 30 through cathode follower coupling circuits 27 and 28. Each of the output waves at the multivibrator are also differentiated in differentiator circuits 31 and 32, respectively, so the wave of Fig. 3B appears as the differentiated wave of Fig. 3D and the wave of Fig. 3C appears as the differentiated wave of Fig. 3E. These two differentiated waves are applied to an adder circuit 33 which is arranged to conduct only for negative peak signals. The output of the adder is a series of negative voltage pulses which appear twice during each horizontal line time as shown in Fig. 3F. These negative pulses are then applied to multivibrator 22 which has an unstable period equal to one-quarter the time between two synchronizing pulses. The output of multivibrator 22 is a pair of output waves as shown in Fig. 3G and Fig. 3H appearing at terminals 34 and 35, respectively, which have twice the frequency of the output waves of multivibrator 21. These waves are applied to intermediate output terminals 36 and 37 through cathode follower couplers 38 and 39, respectively. The output waves of multivibrator 22 are also applied to multivibrator 23 through differentiator circuits 40 and 41, producing waves as shown in Figs. 3I and 3J which are added in adder circuit 42 to give a chain of pulses as shown in Fig. 3K. As multivibrator 23 has an unstable period equal to one-eighth the time between two synchronizing pulses the triggering pulses produce a pair of rectangular waves at terminals 43 and 44 as shown in Figs. 3L and 3M. These signals are applied to intermediate output terminals 45 and 46 through cathode follower coupling circuits 47 and 48, respectively. The rectangular waves of multivibrator 23 have twice the freqency of multivibrator 22 and four times the frequency of multivibrator 21.

Inasmuch as it is desired to apply only one of the rectangular waves from each pair of multivibrator outputs to the color television system at one time, switches 49, 50 and 51 are provided, respectively, between the intermediate output terminal pair 29 and 30 and output terminal 52, the intermediate output terminal pair 36 and 37 and output terminal 53, and the intermediate output terminal pair 45 and 46 and output terminal 54.

Figure 4A:
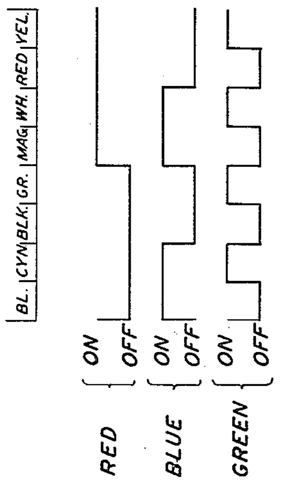
Figs. 4A and 4B show two examples of the many combinations of signals that can be applied to the color television system by the color bar generator in accordance with the invention.
Figure 4B:
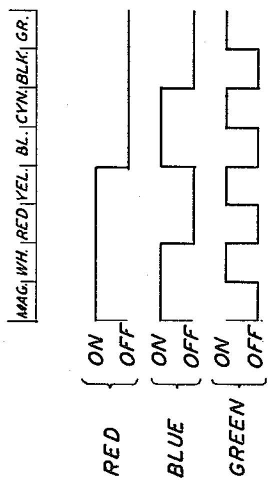

Consideration will now be given to the vertical color bar pattern which may be generated on a viewing screen of a tricolor receiver tube through use of the color bar generator in accordance with the invention. Though the color bar generator is normally connected into the television system as shown in system 10 of Fig. 1, obviously the same color bar pattern results when the output terminals 52, 53 and 54 of the color bar generator are connected directly to the red, green and blue electron guns of a tricolor receiving tube. For purposes of simplifying the explanation of how the color bar pattern is produced, the color bar generator will be considered connected to the tricolor tube in the last-named manner. With output terminals 52, 53 and 54 connected respectively to the red, green and blue electron guns of a tricolor receiver tube and switch 49 in contact with terminal 30, switch 50 in contact with terminal 36, and switch 51 in contact with terminal 46, the rectangular wave pulses applied to the electron guns during each horizontal line time will be such as shown in Fig. 4A. As further shown in Fig. 4A these waves switch the respective guns on and off thereby producing on the screen of the receiver tube during one picture frame period a vertical bar pattern made up of eight colors including black and white, in the order of: blue, cyan, black, green, magenta, white, red and yellow. Obviously by changing the contact position of switches 49, 50 and 51 it is possible to change the color of any individual vertical bars in the color bar pattern of any one of the possible eight colors. For example, by way of illustration, with switch 49 in contact with terminal 29 and the other switches in the same contact position as described with reference to Fig. 4A, the waves applied to the electron guns and the vertical bar pattern appearing on the face of the screen will be as shown in Fig. 4B. Other orders of color sequences can be provided by changing the pattern of connection between output terminals 52, 53 and 54 and the electron guns of the color receiving tube.

It is understood that the above-described arrangement is illustrative of the application of the principles of the invention and that numerous other arrangements might be devised by those skilled in the art without departing from the spirit and scope of the invention.

What is claimed is:

A rectangular wave generator comprising a plurality of monostable multivibrators connected in series relationship, each of said multivibrators including an input terminal and a pair of output terminals and being adapted to produce at said output terminals a pair of rectangular waves of simultaneous occurrence and opposite phase, means for applying constant frequency triggering pulses to the input terminal of the first multivibrator in said series, means for coupling the output terminals of each multivibrator to a pair of external terminals, means coupled between the output terminals of a preceding multivibrator and the input terminal of the succeeding multivibrator for generating triggering pulses occurring at twice the frequency of the triggering pulses applied to the preceding multivibrator whereby the frequency of each of the output rectangular waves of the succeeding multivibrator is of twice the frequency of the output waves of the preceding multivibrator, means for deriving from all of said external output terminals, together, a time sequence of selected ones of said rectangular waves.

References Cited in the file of this patent

UNITED STATES PATENTS

| | | |
|---|---|---|
| 2,390,608 | Miller et al. | Dec. 11, 1945 |
| 2,668,188 | Naslund | Feb. 2, 1954 |
| 2,683,187 | Rynn | July 6, 1954 |